May 19, 1936.  E. O. BENNETT  2,041,316
FLEXIBLE STUFFING BOX ASSEMBLY
Filed Oct. 4, 1934
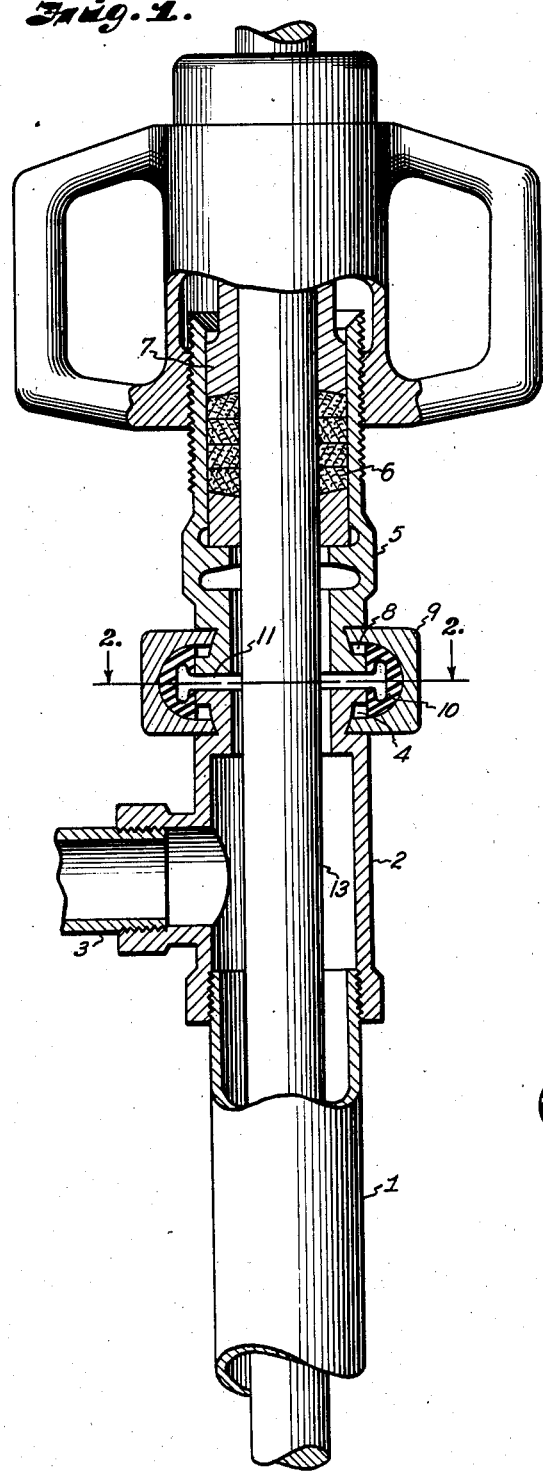
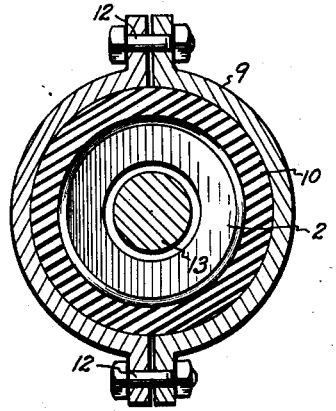
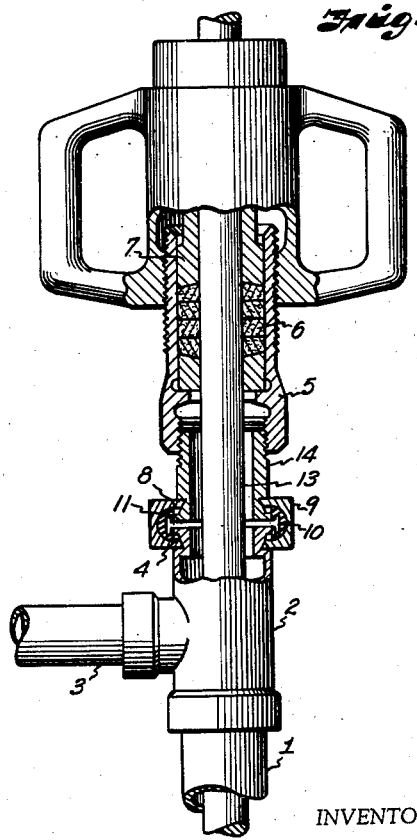
INVENTOR.
Edwin O. Bennett
BY
ATTORNEY.

Patented May 19, 1936

2,041,316

UNITED STATES PATENT OFFICE 2,041,316

FLEXIBLE STUFFING BOX ASSEMBLY

Edwin O. Bennett, Ponca City, Okla., assignor to Continental Oil Company, Ponca City, Okla., a corporation of Delaware Application October 4, 1934, Serial No. 746,871

2 Claims. (Cl. 286—15)

My invention relates to a flexible stuffing box assembly and more particularly to an assembly whereby a stuffing box around a pump rod in a pumping oil well is rendered tight.

This invention is an improvement over that shown in my Patent 1,928,122, dated September 26, 1932, relating to the same subject matter.

The sucker rod in a pumping well is given reciprocating action by a walking beam. In a transmission of this nature, the reciprocating rod undergoes an oscillating or angular motion in addition to its reciprocation. This angular motion works the packing in the stuffing box loose and it soon becomes badly worn on one side or the other, depending upon the direction of the angular motion. When this occurs it begins to leak and both oil and gas escape from the well, producing a fire hazard.

In assembling the sucker rods through the stuffing box it frequently happens that the load of the rods must be taken by the stuffing box and transmitted to the oil well casing. The flexible coupling must be of such a nature that this load can be taken without danger of rupturing or injuring the coupling.

One object of my invention is to provide a stuffing box wherein that portion containing the packing is self-aligning.

Another object of my invention is to provide a stuffing box assembly wherein the packing is flexibly mounted in order to preclude wear due to the angular motion of the reciprocating rod.

A further object of my invention is to provide an assembly wherein wear on the pumping rod will be minimized.

Another object of my invention is to provide a stuffing box assembly wherein the packing is flexibly mounted and a construction which will enable the load of the sucker rods to be taken directly by the casing.

In the accompanying drawing which forms part of the instant specification and in which like reference numerals are used to indicate like parts in the various views;

Figure 1 is a sectional elevation of a stuffing box assembly embodying one mode of carrying out my invention.

Figure 2 is a sectional view taken along the line 2—2 of Figure 1.

Figure 3 is a sectional elevation of a modification showing another construction embodying my invention.

In my prior patent, 1,928,122, I disclosed an assembly in which a pair of nipples were connected by a flexible connection, one of the nipples being adapted to be screwed into a T of the casinghead, the other being screwed to a stuffing box. In my prior patent, the resilient ring or rubber sleeve was such that it normally held the nipples spaced apart. In the present embodiment, the ring acts only as a sealing means, and a coupling ring which holds the sealing means in place acts to hold the stuffing box and the casing head normally spaced apart.

In general, this invention contemplates the provision of a pair of circumferential grooves formed in the casinghead and the stuffing box in which grooves a coupling ring is adapted to seat.

The present arrangement has an advantage over the previous structure in that;

1. The length of the assembly from the top of the well casing to the top of the stuffing box is made much shorter. This is of great advantage where wells are being pumped with long strokes, and greatly simplifies the operation of assembling or taking down the stuffing box when it becomes necessary to remove the pump rod from the well.

2. The use of two nipples is eliminated.

3. In assembling the pump rod whose length is frequently great and consequently represents a heavy load, the weight of the rod is rested upon the stuffing box. In the assembly shown, the thrust occasioned by the weight is transmitted from the stuffing box through the coupling ring directly to the casinghead.

More particularly referring now to the drawing, an oil well tubing 1 terminates in a casinghead 2, which is usually in the form of a T and to which is connected oil well eduction tubing 3. The upper portion of the casinghead 2 is provided with a peripheral groove 4, the bottom of which may be generated along the surface of a sphere. The stuffing box 5 may be of any suitable construction and is provided with packing rings 6 which are pressed in place by a follower 7. The bottom of the stuffing box 5 is provided with a peripheral groove 8 similar to peripheral groove 4. The stuffing box is flexibly mounted on the casinghead 2 by means of a clamping ring 9 having a U-shaped cross section and being formed to fit the grooves 4 and 8. The sealing ring, which may be of rubber or any other suitable material 10 is pressed by the clamping ring against the space 11 between the stuffing box and the casinghead. By reference to Figure 1, it will be seen that the stuffing box is supported by the clamping ring 9, which in turn is supported by the casinghead.

It will also be appreciated that the stuffing box may perform slight angular movements to accommodate it to the movements occasioned by the pumping operations. The clamping ring 9 may be made in two parts held together by bolts 12 as can readily be seen by reference to Figure 2. A pump rod 13 passes through this assembly and is connected to the usual walking beam for reciprocating motion.

In the modification shown in Figure 3, the stuffing box is provided with a nipple 14 to enable all stuffing boxes to be used with the new arrangement, which consists primarily of a casinghead T 2, provided with a peripheral groove 4.

It will be seen that I have accomplished the objects of my invention. I have provided an improved construction in which the assembly is shorter, which is of advantage where wells are to be pumped with long strokes. Besides, the assembly greatly simplifies the operation of assembling or taking down the stuffing box when it becomes necessary to pull the pump rods from the well.

Having thus described my invention, what I claim is:

1. Means for mounting a stuffing box for a well pump rod comprising a casinghead secured to a well casing and having an integral extension provided with a peripheral groove, a stuffing box in axial alignment with and normally spaced apart from said well casing and having an integral extension provided with a peripheral groove, a clamping ring having projections seated in said peripheral grooves and forming a connection between said casinghead and said stuffing box which holds them spaced apart, a sealing ring clamped between said clamping ring and the free ends of said casinghead and said stuffing box adapted to form a liquid and gas tight joint, one of the projections of said clamping ring being of less width than the width of the groove in which it is seated and providing for a slight angular movement of the stuffing box to accommodate it to movements occasioned by pumping operations.

2. Means for mounting a stuffing box for a well pump rod comprising a casinghead secured to a well casing and provided with a peripheral groove, a stuffing box, a peripherally grooved nipple integral therewith, said stuffing box being in axial alignment with said casinghead and normally spaced apart therefrom, a clamping ring having projections seated in said peripheral grooves and forming a connection between said casinghead and said nipple which holds them spaced apart, a sealing ring clamped between said clamping ring and the free ends of said casinghead and said nipple adapted to form a liquid and gas tight joint, one of the projections of said clamping ring being of less width than the width of the groove in which it is seated and providing for a slight angular movement of the stuffing box to accommodate it to movements occasioned by pumping operations.

EDWIN O. BENNETT.